US011928702B1

(12) United States Patent
Krause (10) Patent No.: US 11,928,702 B1
(45) Date of Patent: Mar. 12, 2024

(54) BLOCKCHAIN BASED SHOPPER INFORMATION PROCESSING SYSTEM AND RELATED METHODS

(71) Applicant: Inmar Clearing, Inc., Winston-Salem, NC (US)

(72) Inventor: Ken Krause, Lakeland, FL (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/073,864

(22) Filed: Dec. 2, 2022

(51) Int. Cl.
G06Q 30/00 (2023.01)
G06Q 20/36 (2012.01)
G06Q 20/38 (2012.01)
G06Q 30/0207 (2023.01)
G06Q 30/0226 (2023.01)

(52) U.S. Cl.
CPC ......... *G06Q 30/0229* (2013.01); *G06Q 20/36* (2013.01); *G06Q 20/389* (2013.01); *G06Q 30/0224* (2013.01); *G06Q 30/0233* (2013.01); *G06Q 30/0236* (2013.01)

(58) Field of Classification Search
None
See application file for complete search history.

(56) References Cited

U.S. PATENT DOCUMENTS 11,057,189 B2 * 7/2021 Wei ........................ H04L 9/0891
11,436,368 B2 * 9/2022 Beno ................... G06F 21/6245

2018/0247320 A1 8/2018 Gauld
2019/0108543 A1 4/2019 Chan et al.
2019/0205563 A1 * 7/2019 Gonzales, Jr. ........ H04L 9/3247
2019/0362388 A1 * 11/2019 Bugga ................ G06Q 30/0269
2019/0370866 A1 * 12/2019 Lawbaugh ......... G06Q 30/0277
(Continued)

FOREIGN PATENT DOCUMENTS

GB 2591324 A * 7/2021 ............. G06F 21/62
WO WO-2019133309 A1 * 7/2019 ......... G06F 16/1805
(Continued)

OTHER PUBLICATIONS

Duffy, Keith, Pasha Goudovitch, and Pavel Fedorov. "The application of digital identity in the United States." (2016). (Year: 2016).*
(Continued)

*Primary Examiner* — Michael Bekerman
(74) *Attorney, Agent, or Firm* — ALLEN, DYER, DOPPELT, GILCHRIST, P.A. Attorneys at Law (57) ABSTRACT

A shopper information processing system may include a shopper device associated with a given shopper, and a shopper information processing server. The shopper information processing server may be configured to store shopper information associated with the given shopper on a blockchain, cooperate with the shopper device to store shopper permissions for selectively accessing, on the blockchain, the shopper information, and permit at least one loyalty program to access the selected shopper information on the blockchain based upon the shopper permissions. The shopper information processing server may also be configured to generate a digital coupon based upon an amount of shopper information permitted to be selectively accessed by the at least one loyalty program, and communicate the digital coupon to the shopper device.

22 Claims, 5 Drawing Sheets

(56) References Cited

U.S. PATENT DOCUMENTS

2019/0386818 A1* 12/2019 Cran ..................... H04L 9/3239
2020/0043045 A1*  2/2020 Jurich, Jr. ............ G06Q 20/405
2020/0133955 A1*  4/2020 Padmanabhan ........ G06Q 30/01

FOREIGN PATENT DOCUMENTS

WO   WO-2019210391 A1 * 11/2019   ......... G06F 21/6245
WO   WO-2019232509 A1 * 12/2019   ......... G06Q 30/0254
WO   WO-2020027949 A1 *  2/2020   ........... G06Q 20/363

OTHER PUBLICATIONS

Kjørberg, Vegard. "An Overview of Blockchain-Based Identity Management Systems." (2022). (Year: 2022).*
Deloitte Development LLC; "Making blockchain real for customer loyalty rewards programs"; Deloitte Center for Financial Services; 2016; 20 pages.

* cited by examiner

FIG. 5

BLOCKCHAIN BASED SHOPPER INFORMATION PROCESSING SYSTEM AND RELATED METHODS

TECHNICAL FIELD

The present invention relates to the field of blockchain, and, more particularly, to blockchain based shopper information processing, and related methods.

BACKGROUND

A loyalty program may entice a shopper to shop for products or services at a store associated with the loyalty program. The loyalty program may encourage shoppers to start shopping at the store or continue to shop at the store. To entice a shopper to shop or continue to shop at the store, the loyalty program may provide rewards, for example, of varying levels based upon purchasing behaviors of the shopper.

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period. Other promotional terms may include companion product and purchase quantity requirements.

SUMMARY

A shopper information processing system may include a shopper device associated with a given shopper, and a shopper information processing server. The shopper information processing server may be configured to store shopper information associated with the given shopper on a blockchain, cooperate with the shopper device to store shopper permissions for selectively accessing, on the blockchain, the shopper information, and permit at least one loyalty program to access the selected shopper information on the blockchain based upon the shopper permissions. The shopper information processing server may also be configured to generate a digital coupon based upon an amount of shopper information permitted to be selectively accessed by the at least one loyalty program, and communicate the digital coupon to the shopper device.

The digital coupon may have a redemption value associated therewith. The shopper information processing server may be configured to set the redemption value based upon the amount of selected shopper information permitted to be accessed by the at least one loyalty program, for example.

The shopper information may be stored in a digital wallet of shopper information, for example. The at least one loyalty program may include a plurality of loyalty programs.

The shopper information processing server may be configured to cooperate with the shopper device to store shopper permissions for accessing selected shopper information for each of the plurality of loyalty programs, for example. The shopper information processing server may be configured to generate the digital coupon based upon an amount of selected shopper information permitted to be accessed for a corresponding one of the plurality of loyalty programs.

The shopper information may include at least one of diet, income, birthday, credit authorization information, and payment card information, for example. The shopper information may include a product purchase history of the given shopper.

A method aspect is directed to a method of processing shopper information. The method may include using a shopper information processing server to store shopper information associated with a given shopper on a blockchain, cooperate with a shopper device associated with the given user to store shopper permissions for selectively accessing, on the blockchain, the shopper information, and permit at least one loyalty program to access the selected shopper information on the blockchain based upon the shopper permissions. The method may also include using the shopper information processing server to generate a digital coupon based upon an amount of shopper information permitted to be selectively accessed by the at least one loyalty program, and communicate the digital coupon to the shopper device.

A computer readable medium aspect is directed to a non-transitory computer readable medium for processing shopper information. The non-transitory computer readable medium includes computer executable instructions that when executed by a processor cause the processor to perform operations. The operations may include storing shopper information associated with a given shopper on a blockchain, and cooperating with a shopper device associated with the given user to store shopper permissions for selectively accessing, on the blockchain, the shopper information. The operations may also include permitting at least one loyalty program to access the selected shopper information on the blockchain based upon the shopper permissions, and generating a digital coupon based upon an amount of shopper information permitted to be selectively accessed by the at least one loyalty program. The operations may further include communicating the digital coupon to the shopper device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
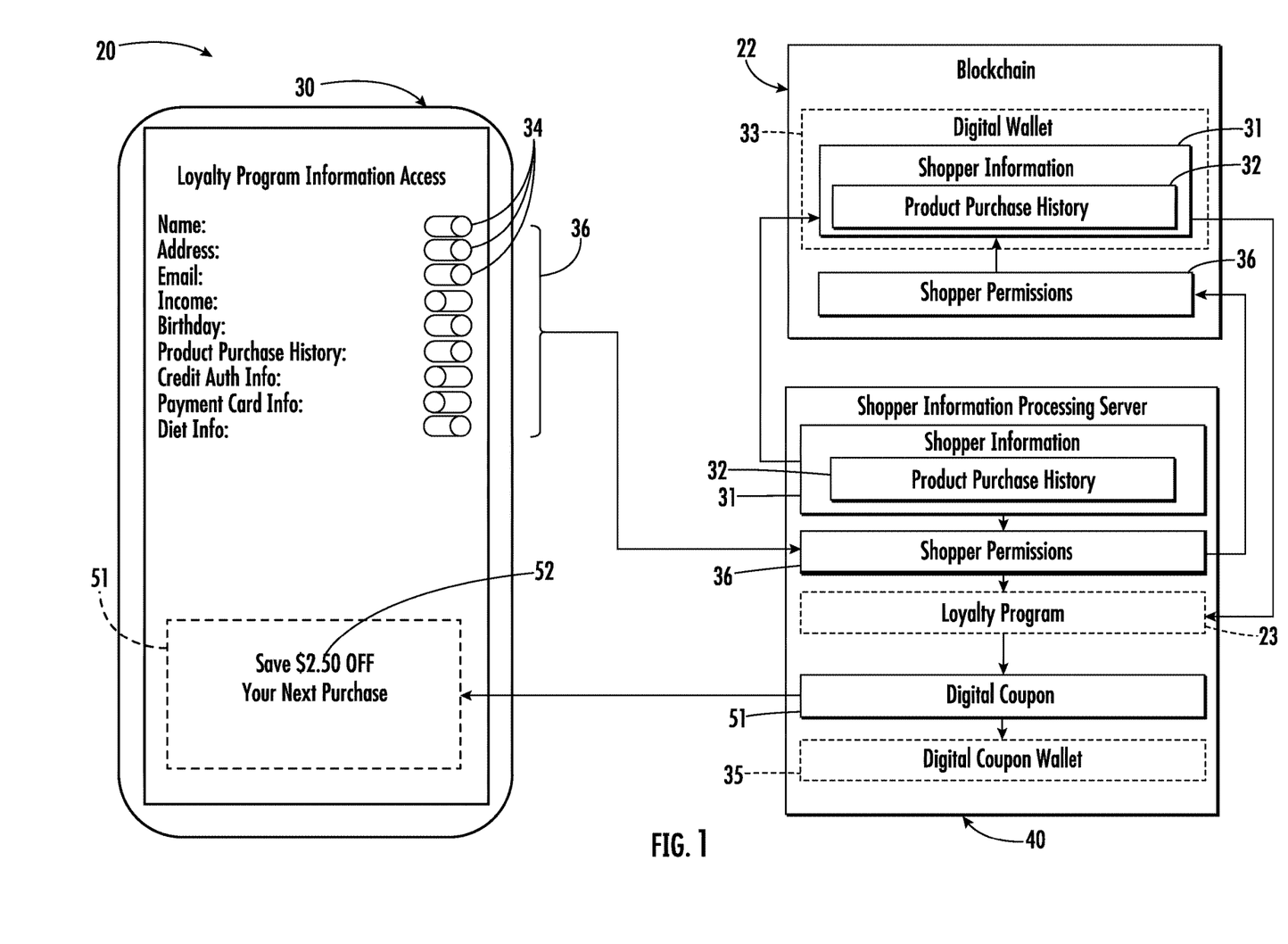
FIG. 1 is a schematic block diagram of a shopper information processing system in accordance with an embodiment.
Figure 2:
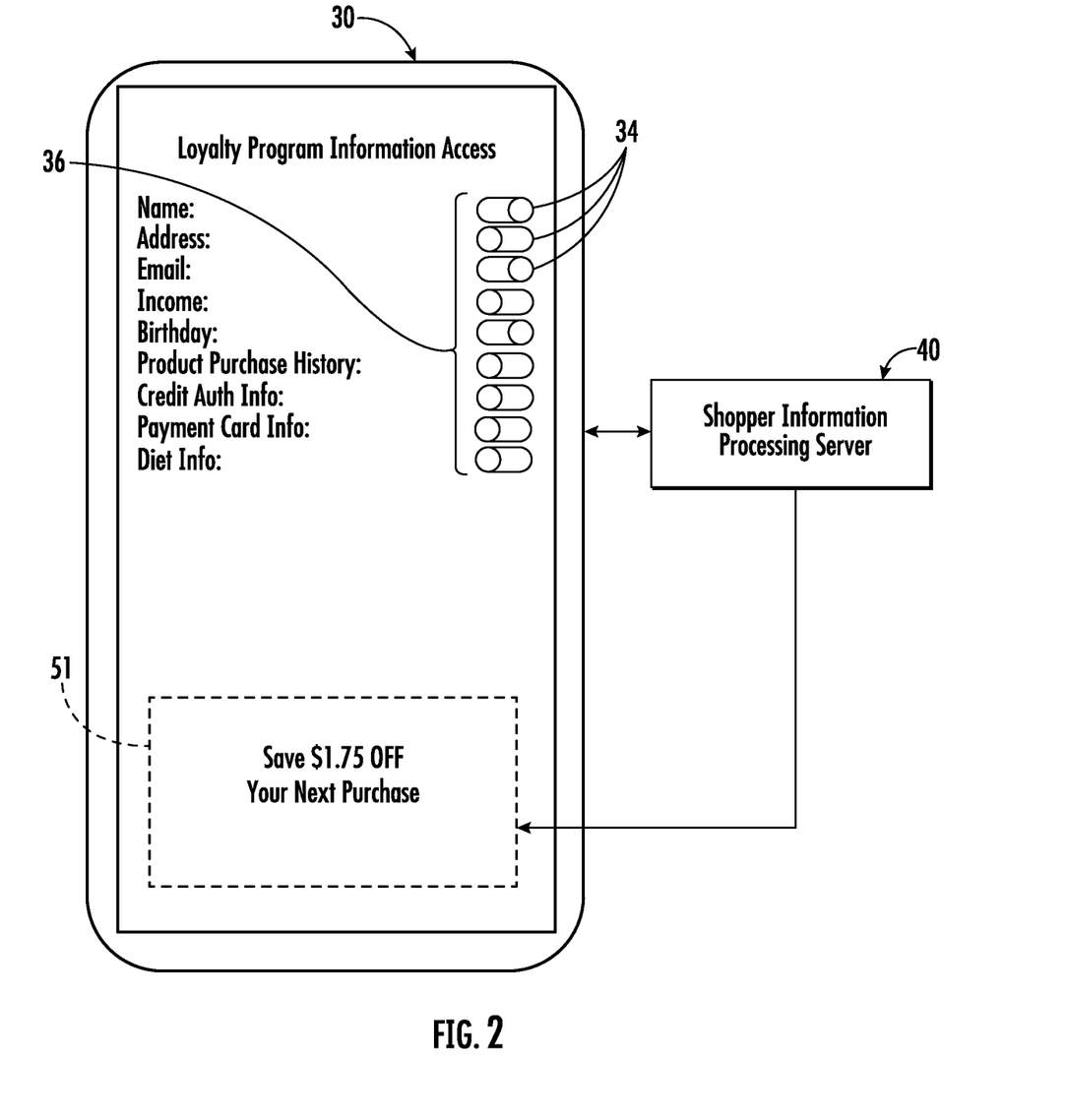
FIG. 2 is a schematic block diagram of a portion of the shopper information processing system of FIG. 1 showing different shopper permissions.
Figure 3:
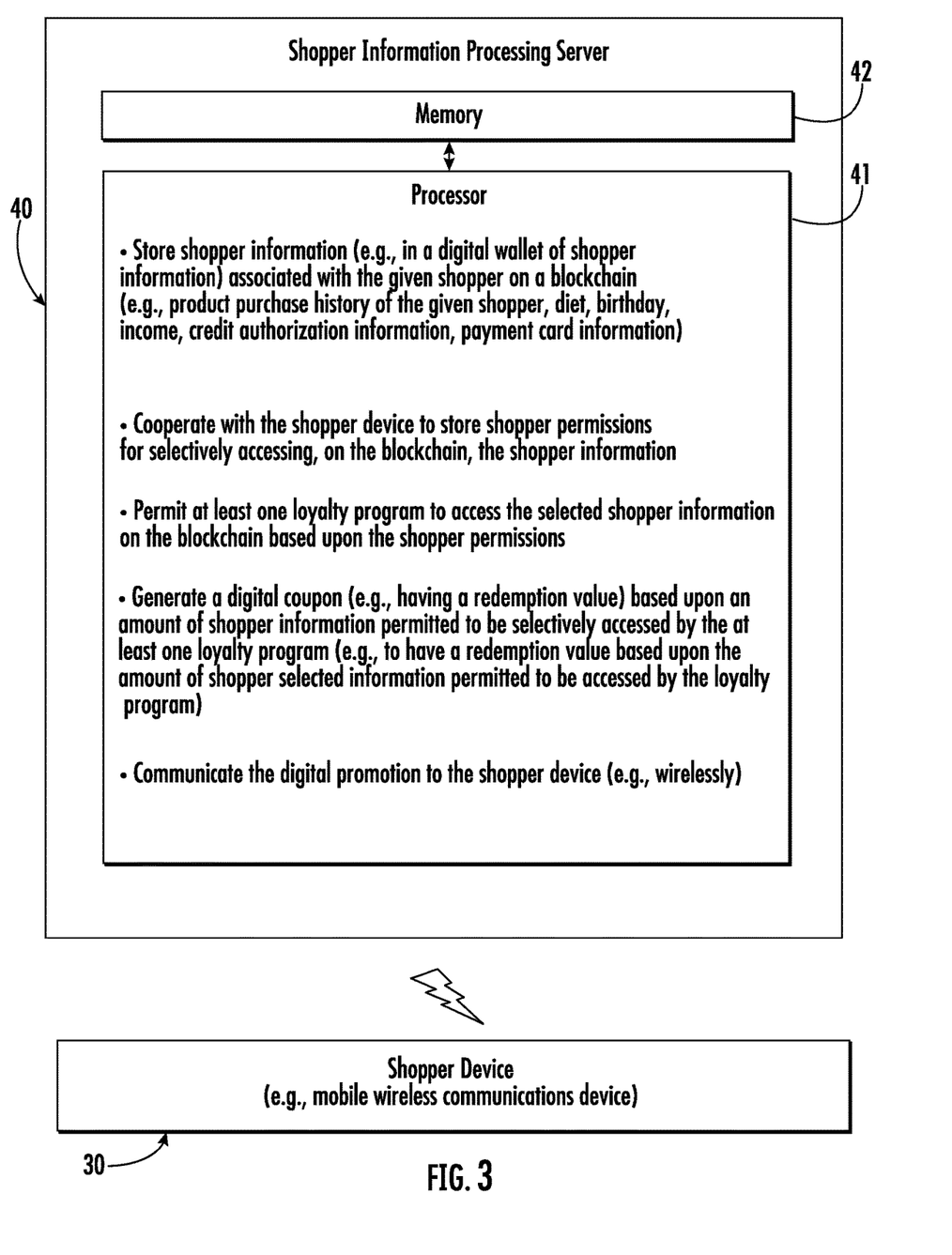
FIG. 3 is a more detailed schematic block diagram of the shopper information processing server, and the shopper device of FIG. 1.

Referring initially to FIGS. 1-3, a shopper information processing system 20 includes a shopper device 30 associated with a given shopper. The shopper device 30 is illustratively in the form of a mobile wireless communications device, and more particularly, a mobile or smart phone. The shopper device 30 may be another type of device, for example, a personal computer, a tablet computer, or a wearable computer, for example.

The shopper information processing system 20 also includes a shopper information processing server 40. The shopper information processing server 40 includes a processor 41 and an associated memory 42 (FIG. 3). While operations of the shopper information processing server 40 are described herein, it should be understood that the processor 41 and the memory 42 cooperate to perform the operations.

Figure 4:
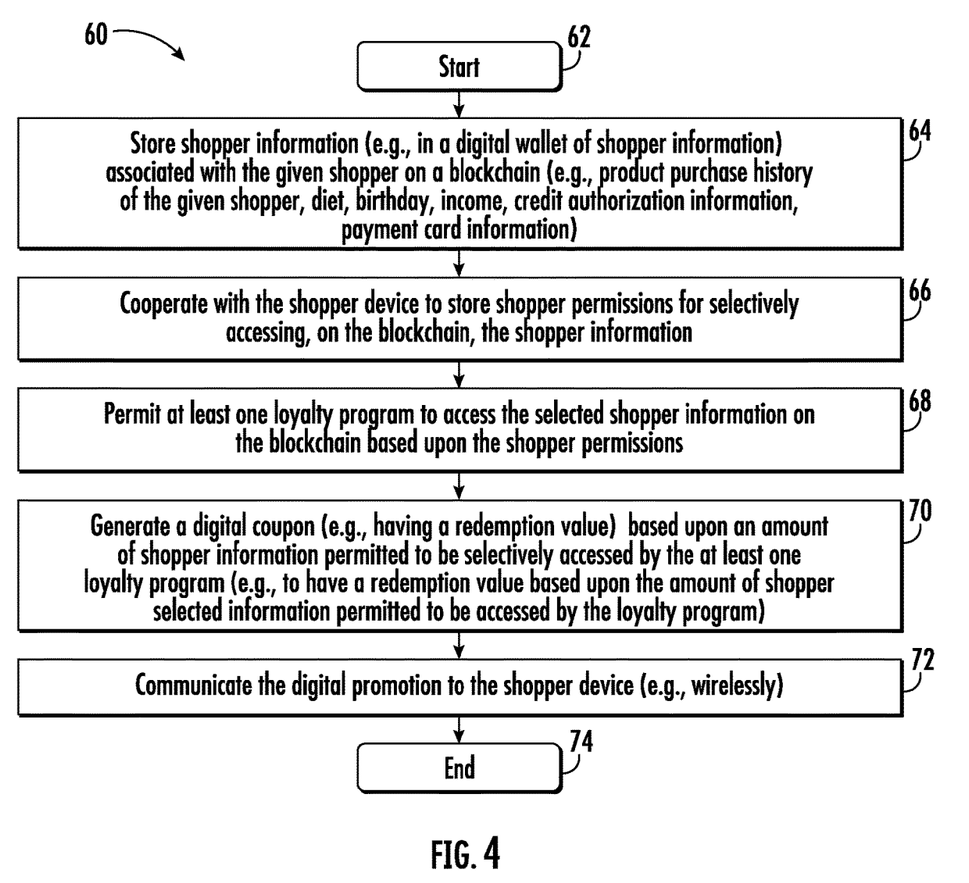
FIG. 4 is a flow chart illustrating operation of the shopper information processing server in accordance with an embodiment.

Referring now additionally to the flowchart 60 in FIG. 4, beginning at Block 62, operations of the shopper information processing server 40 will now be described. At Block 64, the shopper information processing server 40 stores shopper information 31 associated with the given shopper on a blockchain 22. The blockchain 22 may be a permissioned blockchain, for example. While processing the shopper information 31 is described with respect to the given shopper for simplicity of explanation, those skilled in the art will appreciate that the shopper information processing server 40 processes shopper information as described herein for many shoppers.

The shopper information 31 may be stored in a digital wallet 33 on the blockchain 22. In other words, the given shopper has a digital wallet 33 on the blockchain 22, and within the digital wallet is the shopper information 31.

The shopper information 31 may include any one or more of diet information (e.g., gluten free, low fat, etc.), name, address, phone number, income, brand preference, store preferences, birthday or birthdate, credit authorization information, and payment card information, for example. The shopper information 31 may include other and/or additional information. For example, the shopper information may include a product purchase history 32 of the given shopper. The product purchase history 32 may include dates and times of when products were purchased, the quantity of products purchased, a description of purchased products, product identifier (e.g., stock keeping units, uniform product codes, etc.), price paid, and whether a coupon was applied to the product or purchase.

The product purchase history 32 may be obtained, for example, by the shopper information processing server 40 and placed on the blockchain 22. The given shopper may provide credentials (e.g., as input to the shopper device 30) to any one or more loyalty programs 23 along with permission to access the product purchase history 32, to the shopper information processing server 40 so that the shopper information processing server obtains the product purchase history either from a remote computer associated with retailers or loyalty programs, and/or from a database stored in the memory 42 of the shopper information processing server. The shopper information 31 may be obtained from the given shopper, obtained from retailer servers, for example, and/or aggregated from various remote sources and/or internal processing. As will be appreciated by those skilled in the art, the shopper information processing server 40 may perform other and/or additional functions, for example, loyalty program processing on behalf of one or more retailers or wholesalers, and/or coupon (e.g., paper and/or digital) coupon processing including verification and redemption processing (e.g., via cooperation with a point-of-sale device).

The shopper information processing server 40, at Block 66, cooperates with the shopper device 30 to store shopper permissions 36 for selectively accessing, on the blockchain 22, the shopper information 31. More particularly, the shopper information processing server 40 may provide a user interface (UI) that provides or lists, for example, on a display of the shopper device 30, stored shopper information 31 on the blockchain 22. The given shopper, by way of input to the shopper device 30 or UI, may select which segments, portions, or specific data of the shopper information 31 that the given shopper wants to make available, for example, to third parties, or not make available. For example, the UI may display toggle switches 34 each associated with an individual segment of the shopper information 31 (e.g., name, address, email, etc.) whereby the given shopper may individually select which shopper information to share. In some embodiments, the permissions 36 may be more than a binary share, no-share, for example, share with grocery stores, but not home improvement stores. The permissions 36 may have time periods of expiration associated therewith, for example, share for 30-days.

The shopper information processing server 40 may accept the given shopper's input regarding the shopper permissions 36 and store the shopper permissions. The shopper permissions 36 may be stored on the blockchain 22 and/or stored locally in the memory 42 of the shopper information processing server 40. The shopper permissions 36, when set accordingly, permit a third-party to selectively access the shopper information 31, as will be described in further detail below.

As it relates to the blockchain 22, the shopper information processing server 40 may, either alone or in conjunction with the given shopper, be considered an administrator such that it has ownership of the shopper information 31 on the blockchain and can set the privileges for access. In other words, as will be appreciated by those skilled in the art, the shopper information server 40 controls a permissions ledger that controls access to the distributed ledger on the blockchain 22.

The shopper information processing server 40 permits a loyalty program 23, for example, associated with a retailer, such as, for example, a grocery store, to access the selected shopper information on the blockchain 22 based upon the shopper permissions 36 (Block 68). In a given implementation example, the given shopper may enroll in a loyalty program 23 associated with a retailer. Upon enrollment, the retailer, via the loyalty program, may obtain only basic information, such as, for example, name and phone number. The retailer may desire additional shopper information, for example, to provide more customized offers and/or improve the checkout experience (e.g., by knowing payment preferences, etc.). The given shopper may set the shopper permission 36 such that the retailer, via the loyalty program 23, can access none, some, or all of the shopper information 31 stored in the blockchain 22. The loyalty program 23 may already be existing, for example, the given shopper may already be enrolled, and the shopper information 31 selected may be adjusted by the given shopper.

In another implementation example, the shopper information processing server 40 may continually or periodically permit access to the shopper information 31 by the loyalty program 23. For example, the shopper information processing server 40 may update the stored shopper information 31 either by way of input from the given shopper, and/or by way of communicating with one or more point-of-sale terminals and/or retailer servers to update the product purchase history 32. In other words, the shopper information 31 may updated as the shopper purchases products. The given shopper may set the shopper permissions 36 to permit the loyalty program, for example, to permit access to those updates (e.g., as they happen).

The shopper information processing server 40 permits the loyalty program 23 to have access by providing the loyalty program with the credentials to access the shopper information on the blockchain 22. More particularly, the shopper information server 40 controls or sets, according to the shopper permissions 36, the permissions ledger that controls access to the distributed leger, or the shopper information 31, on the blockchain 22. The loyalty program 23 accesses the distributed ledger according to the permissions ledger. In other words, the loyalty program 23 accesses the selected shopper information 31 for which permissions were granted.

The shopper information processing server 40 generates a digital coupon 51 based upon an amount of shopper information 31 permitted to be selectively accessed by the loyalty program 23 (Block 70). The digital coupon 51 may be redeemable toward purchase of product at a physical store or an online e-commerce platform associated with the loyalty program 23. For example, the shopper information processing server 40 may generate the digital coupon 51 based upon sharing or permitting access to a threshold amount (e.g., name, email, and product purchase history), such that if the threshold amount is permitted to be accessed, then the digital coupon 51 is generated. The shopper information processing server 40 may generate more than one digital coupon 51.

The digital coupon 51 has a redemption value 52 associated therewith, for example, for a dollar amount off the purchase price of a given product for purchase (e.g., at the retailer associated with the loyalty program 23). The shopper information processing server 40 generates the digital coupon 51 based upon the amount of shopper information permitted to be shared for example, by setting the redemption value based upon the amount of shopper information permitted to be accessed by the loyalty program 23. More particularly, the shopper information processing server 40 may set the redemption value of the digital coupon 51 to be higher when the amount of selected shopper information 31 permitted to be accessed is higher (FIG. 1), or lower for less shopper information (FIG. 2). For example, for each part or segment of shopper information 31 (e.g., each of name, address, email address, purchase history, etc.) in the digital wallet 33 on the blockchain 22 permitted to be shared, the shopper information processing server 40 may increment the redemption value 52 from a baseline (e.g., $0.25 per item above the baseline).

In an embodiment, the shopper information processing server 40 may generate an amount of digital coupons 51 based upon the amount of the shopper information 31 permitted to be selectively accessed by the loyalty program 23 such that the higher amount of shopper information permitted to be accessed results in a higher number of digital coupons being generated. In an embodiment, the brand of the products redeemable by way of the digital coupon 51 may be determined based upon the amount of shopper information 31 permitted to be selectively accessed. For example, if a lower amount of shopper information 31 is permitted to be accessed, the digital coupon 51 may be redeemable toward a generic branded product, while if a higher amount of shopper information is permitted to be accessed, the digital coupon may be redeemable toward a brand name product.

At Block 72, the shopper information processing server 40 communicates the digital coupon 51 to the shopper device 30. For example, the digital coupon 51 may be wirelessly communicated to the shopper device 30 for display thereat. The digital coupon 51 may be displayed with a machine readable code to permit scanning or redemption at a POS terminal. Alternatively, the digital coupon 51 may be stored in a digital wallet 35 of digital coupons associated with the given shopper, and the POS terminal may communicate with the shopper information processing server 40 to redeem the digital coupon 51. Operations end at Block 74.

Figure 5:
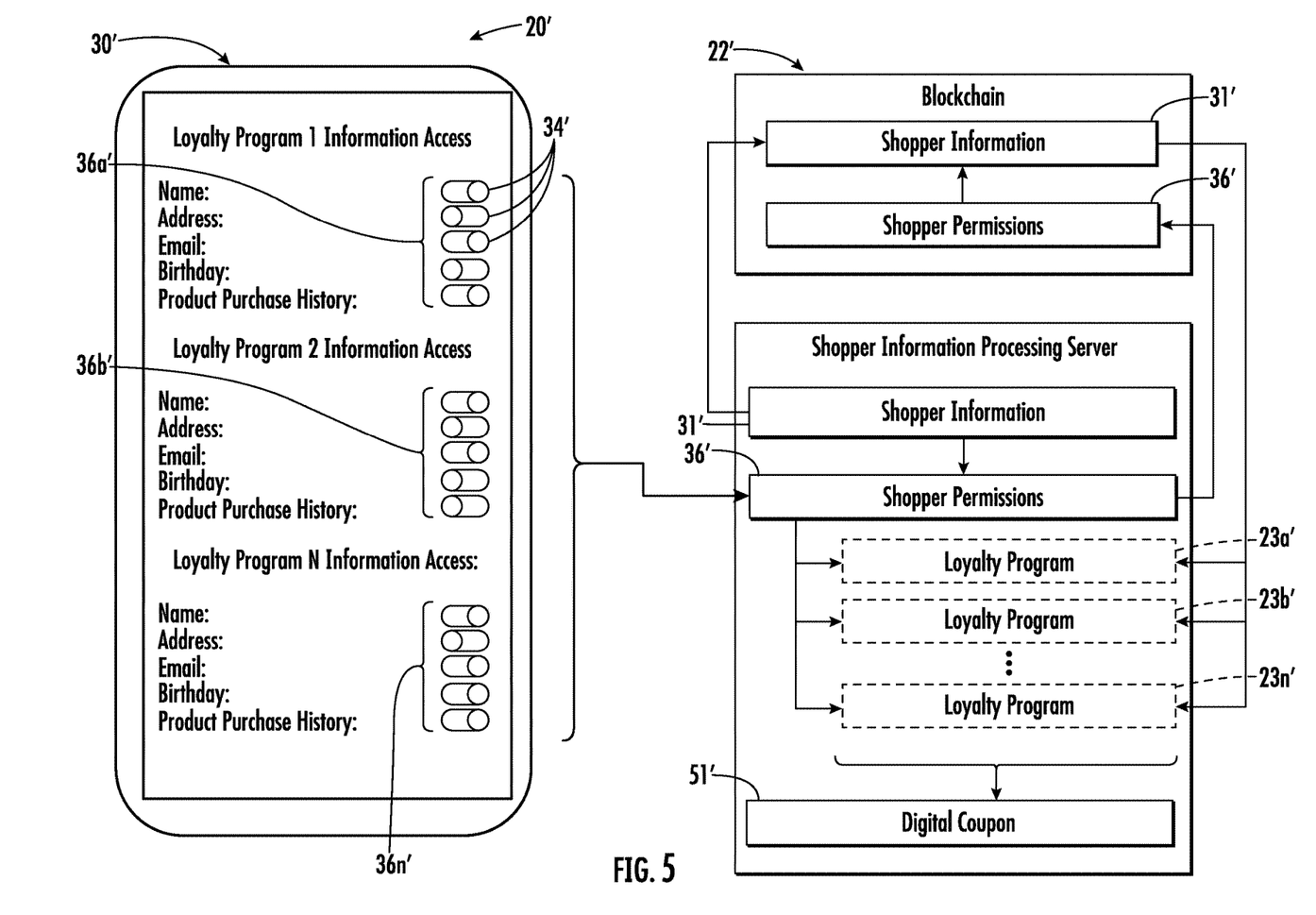
FIG. 5 is a schematic diagram of a shopper information processing system in accordance with another embodiment.

Referring now to FIG. 5, in accordance with another embodiment, the shopper information processing server 40' cooperates with the shopper device 30' to store shopper permissions 36a'-36n' for accessing, on the blockchain 22' selected shopper information 31' for each of a plurality of loyalty programs 23a'-23n'. More particularly, the given shopper may independently set, via inputs (e.g., digital toggle switches 34') displayed on the shopper device 30' respective shopper permissions 36a'-36n' on a per loyalty program basis. The shopper information processing server 40' may generate the digital coupon 51' based upon an amount of shopper selected shopper information 31' permitted to be accessed for a corresponding one of the loyalty programs 23a'-23n'. In some embodiments, the shopper information processing server 40' may generate the digital coupon 51' based upon the aggregate amount of selected shopper information permitted to be accessed for some or all of the loyalty programs 23a'-23n'. The shopper information processing server 40' may set the redeemable value of the digital coupon 51' based upon the amount of selected shopper information permitted to be accessed, for example, and/or generate the digital coupon based upon reaching a threshold amount of selected shopper information permitted to be accessed, as described with respect to the embodiments above.

A method aspect is directed to a method of processing shopper information 31. The method includes using a shopper information processing server 40 to store shopper information 31 associated with a given shopper on a blockchain 22, cooperate with a shopper device 30 associated with the given user to store shopper permissions 36 for selectively accessing, on the blockchain, the shopper information, and permit at least one loyalty program 23 to access the selected shopper information on the blockchain based upon the shopper permissions. The method also includes using the shopper information processing server 40 to generate a digital coupon 51 based upon an amount of shopper information 31 permitted to be selectively accessed by the at least one loyalty program 23, and communicate the digital coupon the shopper device 30.

A computer readable medium aspect is directed to a non-transitory computer readable medium for processing shopper information 31. The non-transitory computer readable medium includes computer executable instructions that when executed by a processor 41 cause the processor to perform operations. The operations include storing shopper information 31 associated with a given shopper on a blockchain 22, and cooperating with a shopper device 30 associated with the given user to store shopper permissions 36 for selectively accessing, on the blockchain, the shopper information. The operations also include permitting at least one loyalty program 23 to access the selected shopper information 31 on the blockchain 22 based upon the shopper permissions 36, and generating a digital coupon 51 based upon an amount of shopper information permitted to be selectively accessed by the at least one loyalty program 23. The operations further include communicating the digital coupon 51 the shopper device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A shopper information processing system comprising:
a shopper device associated with a given shopper; and
a shopper information processing server configured to store shopper information associated with the given shopper as an administrator on a blockchain such that the shopper information processing server has ownership of the shopper information on the blockchain for setting privileges for access to the shopper information, the shopper information associated with a permissions ledger and a distributed ledger on the blockchain, the permissions ledger controlling access to the distributed ledger, the distributed ledger permitting access to the shopper information on the blockchain,
cooperate with the shopper device to provide a user interface (UI) to permit the given shopper to provide input for selecting subsets of the shopper information defining shopper permissions,
cooperate with the shopper device to permit the shopper to provide credentials for accessing at least one loyalty program,
store the shopper permissions for selectively accessing, on the blockchain, the shopper information by updating the permissions ledger based upon the shopper permissions,
permit the at least one loyalty program to access the selected shopper information on the blockchain, via the distributed ledger, based upon the shopper permissions and the credentials,
generate a digital coupon based upon an amount of shopper information permitted to be selectively accessed by the at least one loyalty program, and
communicate the digital coupon to the shopper device.

2. The shopper information processing system of claim 1 wherein the digital coupon has a redemption value associated therewith; and wherein the shopper information processing server is configured to set the redemption value based upon the amount of selected shopper information permitted to be accessed by the at least one loyalty program.

3. The shopper information processing system of claim 1 wherein the shopper information is stored in a digital wallet of shopper information.

4. The shopper information processing system of claim 1 wherein the at least one loyalty program comprises a plurality of loyalty programs; and wherein the shopper information processing server is configured to cooperate with the shopper device to store shopper permissions for accessing selected shopper information for each of the plurality of loyalty programs.

5. The shopper information processing system of claim 4 wherein the shopper information processing server is configured to generate the digital coupon based upon an amount of selected shopper information permitted to be accessed for a corresponding one of the plurality of loyalty programs.

6. The shopper information processing system of claim 1 wherein the shopper information comprises at least one of diet, income, birthday, credit authorization information, and payment card information.

7. The shopper information processing system of claim 1 wherein the shopper information comprises a product purchase history of the given shopper.

8. A shopper information processing server comprising:
a processor and an associated memory configured to store shopper information associated with a given shopper as an administrator on a blockchain such that the shopper information processing server has ownership of the shopper information on the blockchain for setting privileges for access to the shopper information, the shopper information associated with a permissions ledger and a distributed ledger on the blockchain, the permissions ledger controlling access to the distributed ledger, the distributed ledger permitting access to the shopper information on the blockchain,
cooperate with a shopper device associated with the given shopper to provide a user interface (UI) to permit the given shopper to provide input for selecting subsets of the shopper information defining shopper permissions,
cooperate with the shopper device to permit the shopper to provide credentials for accessing at least one loyalty program,
store the shopper permissions for selectively accessing, on the blockchain, the shopper information by updating the permissions ledger based upon the shopper permissions,
permit the at least one loyalty program to access the selected shopper information on the blockchain, via the distributed ledger, based upon the shopper permissions and the credentials,
generate a digital coupon based upon an amount of shopper information permitted to be selectively accessed by the at least one loyalty program, and
communicate the digital coupon to the shopper device.

9. The shopper information processing server of claim 8 wherein the digital coupon has a redemption value associated therewith; and wherein the processor is configured to set the redemption value based upon the amount of selected shopper information permitted to be accessed by the at least one loyalty program.

10. The shopper information processing server of claim 8 wherein the shopper information is stored in a digital wallet of shopper information.

11. The shopper information processing server of claim 8 wherein the at least one loyalty program comprises a plurality of loyalty programs; and wherein the processor is configured to cooperate with the shopper device to store shopper permissions for accessing selected shopper information for each of the plurality of loyalty programs.

12. The shopper information processing server of claim 11 wherein the processor is configured to generate the digital coupon based upon an amount of selected shopper information permitted to be accessed for a corresponding one of the plurality of loyalty programs.

13. A method of processing shopper information comprising:

using a shopper information processing server to store shopper information associated with a given shopper as an administrator on a blockchain such that the shopper information processing server has ownership of the shopper information on the blockchain for setting privileges for access to the shopper information, the shopper information associated with a permissions ledger and a distributed ledger on the blockchain, the permissions ledger controlling access to the distributed ledger, the distributed ledger permitting access to the shopper information on the blockchain, cooperate with a shopper device associated with the given user to provide a user interface (UI) to permit the given shopper to provide input for selecting subsets of the shopper information defining shopper permissions, cooperate with the shopper device to permit the shopper to provide credentials for accessing at least one loyalty program, store the shopper permissions for selectively accessing, on the blockchain, the shopper information by updating the permissions ledger based upon the shopper permissions, permit the at least one loyalty program to access the selected shopper information on the blockchain, via the distributed ledger, based upon the shopper permissions and the credentials, generate a digital coupon based upon an amount of shopper information permitted to be selectively accessed by the at least one loyalty program, and communicate the digital coupon to the shopper device.

14. The method of claim 13 wherein the digital coupon has a redemption value associated therewith; and wherein using the shopper information processing server comprises using the shopper information processing server to set the redemption value based upon the amount of selected shopper information permitted to be accessed by the at least one loyalty program.

15. The method of claim 13 wherein the shopper information is stored in a digital wallet of shopper information.

16. The method of claim 13 wherein the at least one loyalty program comprises a plurality of loyalty programs; and wherein using the shopper information processing server comprises using the shopper information processing server to cooperate with the shopper device to store shopper permissions for accessing selected shopper information for each of the plurality of loyalty programs.

17. The method of claim 16 wherein using the shopper information processing server comprises using the shopper information processing server to generate the digital coupon based upon an amount of selected shopper information permitted to be accessed for a corresponding one of the plurality of loyalty programs.

18. A non-transitory computer readable medium for processing shopper information, the non-transitory computer readable medium comprising computer executable instructions that when executed by a processor cause the processor to perform operations comprising:

storing shopper information associated with a given shopper as an administrator on a blockchain such that the shopper information processing server has ownership of the shopper information on the blockchain for setting privileges for access to the shopper information, the shopper information associated with a permissions ledger and a distributed ledger on the blockchain, the permissions ledger controlling access to the distributed ledger, the distributed ledger permitting access to the shopper information on the blockchain;

cooperating with a shopper device associated with the given user to provide a user interface (UI) to permit the given shopper to provide input for selecting subsets of the shopper information defining shopper credentials;

cooperating with the shopper device to permit the shopper to provide credentials for accessing at least one loyalty program;

storing the shopper permissions for selectively accessing, on the blockchain, the shopper information by updating the permissions ledger based upon the shopper permissions;

permitting the at least one loyalty program to access the selected shopper information on the blockchain, via the distributed ledger, based upon the shopper permissions and the credentials;

generating a digital coupon based upon an amount of shopper information permitted to be selectively accessed by the at least one loyalty program; and communicating the digital coupon to the shopper device.

19. The non-transitory computer readable medium of claim 18 wherein the digital coupon has a redemption value associated therewith; and wherein the operations comprise setting the redemption value based upon the amount of selected shopper information permitted to be accessed by the at least one loyalty program.

20. The non-transitory computer readable medium of claim 18 wherein the operations comprise storing the shopper information in a digital wallet of shopper information.

21. The non-transitory computer readable medium of claim 18 wherein the at least one loyalty program comprises a plurality of loyalty programs; and wherein the operations comprise cooperating with the shopper device to store shopper permissions for accessing selected shopper information for each of the plurality of loyalty programs.

22. The non-transitory computer readable medium of claim 21 wherein the operations comprise generating the digital coupon based upon an amount of selected shopper information permitted to be accessed for a corresponding one of the plurality of loyalty programs.

* * * * *